(12) United States Patent
Nishihara et al.

(10) Patent No.: US 9,502,702 B2
(45) Date of Patent: Nov. 22, 2016

(54) BICYCLE BATTERY HOLDER, BICYCLE BATTERY, AND RETAINING MEMBER FOR BICYCLE BATTERY

(71) Applicant: Shimano Inc., Sakai, Osaka (JP)

(72) Inventors: Taihei Nishihara, Osaka (JP); Wataru Suzuki, Osaka (JP); Hiroyuki Miyoshi, Osaka (JP); Satoshi Shahana, Osaka (JP); Yuya Ishimaru, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/000,546

(22) Filed: Jan. 19, 2016

(65) Prior Publication Data

US 2016/0254506 A1 Sep. 1, 2016

(30) Foreign Application Priority Data

Feb. 27, 2015 (JP) .................................. 2015-039256

(51) Int. Cl.
| | |
|---|---|
| *B62M 6/90* | (2010.01) |
| *B60K 1/00* | (2006.01) |
| *H01M 2/10* | (2006.01) |
| *B62M 6/40* | (2010.01) |
| *H01M 2/30* | (2006.01) |
| *H01M 2/20* | (2006.01) |

(52) U.S. Cl.
CPC ............. *H01M 2/1083* (2013.01); *B62M 6/40* (2013.01); *B62M 6/90* (2013.01); *H01M 2/206* (2013.01); *H01M 2/305* (2013.01); *H01M 2220/20* (2013.01)

(58) Field of Classification Search
CPC ... B62M 6/90; B60L 11/007; B60L 2200/12; Y02T 10/7005; B60K 1/00; B62K 2204/00
See application file for complete search history.

(56) References Cited

U.S. PATENT DOCUMENTS

| | | | |
|---|---|---|---|
| 5,811,200 A | * | 9/1998 | Lau ..................... H01M 2/0202 429/1 |
| 6,423,443 B1 | | 7/2002 | Tsuboi et al. |
| 6,669,220 B2 | | 12/2003 | Meggiolan |
| 6,896,277 B2 | | 5/2005 | Meggiolan |
| 7,100,932 B2 | | 9/2006 | Meggiolan |
| 7,267,352 B2 | | 9/2007 | Ishikawa |
| 7,934,576 B2 | | 5/2011 | Munksoe |
| 2005/0156001 A1 | | 7/2005 | Dal Pra et al. |
| 2007/0000388 A1 | | 1/2007 | Huang et al. |
| 2009/0261134 A1 | | 10/2009 | Tetsuka et al. |
| 2012/0145852 A1 | * | 6/2012 | Chiang .................... B62M 6/90 248/224.8 |
| 2013/0241170 A1 | * | 9/2013 | Talavasek ................ B62M 6/90 280/279 |

FOREIGN PATENT DOCUMENTS

| | | |
|---|---|---|
| JP | 10 016869 A | 1/1998 |
| JP | 10-16869 A | 1/1998 |
| JP | 3602837 B2 | 12/2004 |

(Continued)

*Primary Examiner* — Bryan Evans

(74) *Attorney, Agent, or Firm* — Global IP Counselors

(57) ABSTRACT

A bicycle battery holder is configured to be mounted to a bicycle. The bicycle battery holder includes a first support portion and a second support portion. The first support portion is configured to support a battery at a first supporting position. The second support portion is configured to support the battery at a second supporting position, along with the first support portion. At least one of the first supporting position and the second supporting position is adjustably mounted.

14 Claims, 10 Drawing Sheets

(56) References Cited

FOREIGN PATENT DOCUMENTS

| JP | 3641055 | B2 | 1/2005 |
| JP | 3641055 | B2 | 4/2005 |
| JP | 1114978 | B2 | 7/2008 |
| JP | 4114978 | B2 | 7/2008 |
| JP | 2011-235749 | A | 11/2011 |
| JP | 2011 235749 | A | 11/2011 |

* cited by examiner

BICYCLE BATTERY HOLDER, BICYCLE BATTERY, AND RETAINING MEMBER FOR BICYCLE BATTERY

CROSS-REFERENCE TO RELATED APPLICATIONS

This application claims priority to Japanese Patent Application No. 2015-039256, filed on Feb. 27, 2015, The entire disclosure of Japanese Patent Application No. 2015-039256 is hereby incorporated herein by reference.

BACKGROUND

Field of the Invention

This invention generally relates to a bicycle battery holder, a bicycle battery, and a retaining member for a bicycle battery.

Background Information

Recently, some bicycles include electrical components that require a power source such as a bicycle battery. Conventionally, a bicycle battery holder is mounted to the bicycle to detachably hold the bicycle battery on the bicycle. One example of a bicycle battery holder is disclosed in Japanese Patent No. 3,602,837.

SUMMARY

Generally, the present disclosure is directed to various features of a bicycle battery holder, a bicycle battery, and a retaining member for a bicycle battery. It has been discovered that the battery weight of a bicycle battery can be reduced more as the capacitance of the bicycle battery is reduced. Thus, the bicycle can be made to be lighter by reducing the battery weight of the bicycle battery. As a result, the burden on the rider to propel the bicycle decreases. On the other hand, as the capacitance of the battery increases, the bicycle can be ridden for a longer distance using the battery. In this way, the optimal electric capacity and weight of a bicycle battery varies depending on the usage of the bicycle. For this reason, a battery holder that can mount a battery depending on the demand of the rider is required.

One object of the present invention is to provide a bicycle battery holder, a bicycle battery, and a retaining member for a bicycle battery that can improve the usability.

In view of the state of the known technology and in accordance with a first aspect of the present disclosure, a bicycle battery holder is configured to be mounted to a bicycle. The bicycle battery holder basically comprises a first support portion and a second support portion. The first support portion is configured to support a battery at a first supporting position. The second support portion is configured to support the battery at a second supporting position, along with the first support portion. At least one of the first supporting position and the second supporting position is adjustably mounted.

In accordance with a second aspect of the present invention, the bicycle battery holder according to the first aspect is configured so that the second support portion is movable with respect to the bicycle.

In accordance with a third aspect of the present invention, the bicycle battery holder according to the second aspect further comprises a moving mechanism configured to move the second support portion with respect to the first support portion.

In accordance with a fourth aspect of the present invention, the bicycle battery holder according to the third aspect is configured so that the moving mechanism comprises a rail for sliding the second support portion.

In accordance with a fifth aspect of the present invention, the bicycle battery holder according to the fourth aspect further comprises a securing structure selectively securing a position of the second support portion with respect to the rail.

In accordance with a sixth aspect of the present invention, the bicycle battery holder according to the fourth or fifth aspect is configured so that the rail is configured to be detachably mounted to a bicycle frame.

In accordance with a seventh aspect of the present invention, the bicycle battery holder according to any one of the first to sixth aspects is configured so that the first support portion is configured to support one end of the battery, and the second support portion is configured to support the other end of the battery.

In accordance with an eighth aspect of the present invention, the bicycle battery holder according to any one of the first to seventh aspects is configured so that the second support portion has one of a convex shape and a concave shape that is configured to mate with one of a protrusion and a recess of the battery having one of a convex shape and a concave shape.

In accordance with a ninth aspect of the present invention, the bicycle battery holder according to the any one of the first to eighth aspects is configured so that the first support portion comprises a terminal that is configured to be electrically connected to the battery.

In accordance with a tenth aspect of the present invention, the bicycle battery holder according to any one of the first to ninth aspects is configured so that the second support portion comprises a lock mechanism that is configured to fix a position of the battery with respect to the second support portion.

In accordance with an eleventh aspect of the present invention, the bicycle battery holder according to any one of the first to tenth aspects further comprises a retaining part configured to support the battery in a portion that is different from the first support portion or the second support portion. The retaining part is configured to couple the first support portion and the second support portion and change in length, corresponding to changes in a distance between the first support portion and the second support portion.

In accordance with a twelfth aspect of the present invention, a bicycle battery comprises a first portion and a second portion. The first portion is configured to be supportable by a bicycle battery holder. The second portion is configured to be connected to another battery in a portion besides the first portion.

In accordance with a thirteenth aspect of the present invention, the bicycle battery according to the twelfth aspect is configured so that a first terminal provided at the first portion, which is configured to be connected to a terminal provided to one of the bicycle battery holder and a terminal of another battery.

In accordance with a fourteenth aspect of the present invention, the bicycle battery according to the thirteenth aspect is configured so that the second portion includes a second terminal configured to be connected to a first terminal of another battery.

In accordance with a fifteenth aspect of the present invention, the bicycle battery according to any one of the twelfth to fourteenth aspects is configured so that the first portion comprises a first fitting portion having one of a convex shape and a concave shape, and the second portion comprises a second fitting portion having one of a convex shape and a concave shape that can be fitted with one of a protrusion and a recess of the first portion.

In accordance with a sixteenth aspect of the present invention, the bicycle battery according to the fifteenth aspect is configured so that the first fitting portion is formed around the first terminal, and the second fitting portion is formed around the second terminal.

In accordance with a seventeenth aspect of the present invention, the bicycle battery according to any one of the twelfth to sixteenth aspects is configured so that one of the first portion or the second portion is configured to be connect to the other battery supply such that electric power can be supplied to an electric component of a bicycle independent from the other battery.

In accordance with an eighteenth aspect of the present invention, a bicycle battery retaining member is used in the bicycle battery according to any one of the twelfth to seventeenth aspects as, and comprising a plurality of attaching portions that are attachable to each of the other batteries and the bicycle battery.

Also other objects, features, aspects and advantages of the disclosed bicycle battery holder, the disclosed bicycle battery and the disclosed retaining member for a bicycle battery will become apparent to those skilled in the art from the following detailed description, which, taken in conjunction with the annexed drawings, discloses illustrative embodiments of the bicycle battery holder, the bicycle battery and the retaining member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
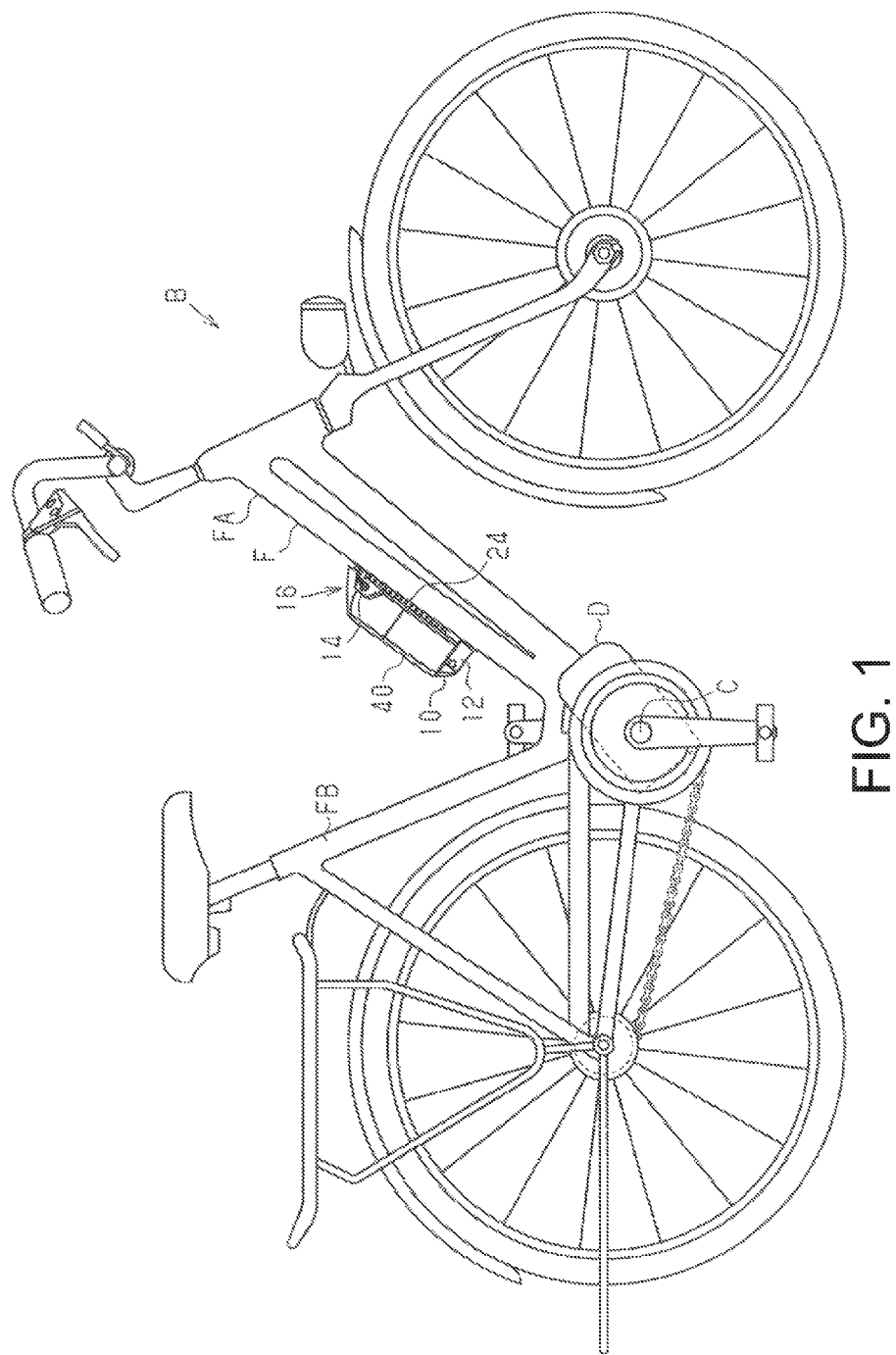
FIG. 1 is a left side elevational view of a bicycle that is equipped with a bicycle battery holder in accordance with one illustrated embodiment.

Referring initially to FIGS. 1 to 10, a bicycle B is illustrated that is equipped with a battery holder 10 in accordance with a first embodiment. As shown in FIG. 1, the bicycle B is equipped with a drive unit D, which is an electric component. The bicycle battery holder 10 is configured to support a battery unit 40, which supplies electric power to the drive unit D. The bicycle battery holder 10 will hereinafter be simply referred to as a battery holder.

The drive unit D comprises a control apparatus and a motor, which are not shown, and assists the manual drive force applied to a crankshaft C using electric power supplied from the battery unit 40. The control apparatus drives the motor in response to a detection from the sensor, which detects a manual drive force. The bicycle B may be a mountain bike or a road bike. The drive unit D may be disposed in the vicinity of the crankshaft C and may be configured to drive a front sprocket or to be provided on a rear wheel or a front wheel.

The battery holder 10 can be attached to a frame F of the bicycle B. The battery holder 10 is preferably attached to a down tube FA or a seat tube FB of the frame F.

Figure 2:
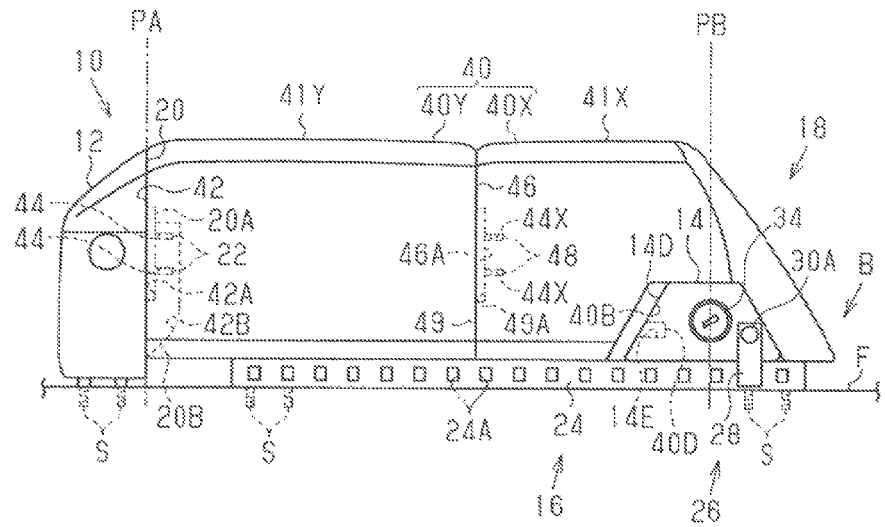
FIG. 2 is a side elevational view of the battery holder illustrated in FIG. 1 in which the battery holder is in a state in which several batteries are mounted.

As seen in FIG. 2, the battery holder 10 comprises a first support portion 12, a second support portion 14, a moving mechanism 16 and a lock mechanism 18. The first support portion 12 is configured to support the battery unit 40. The second support portion 14 is configured to support the first support portion 12 along with the battery 40. The moving mechanism 16 is configured to move the second support portion 14 with respect to the first support portion 12.

Figure 3:
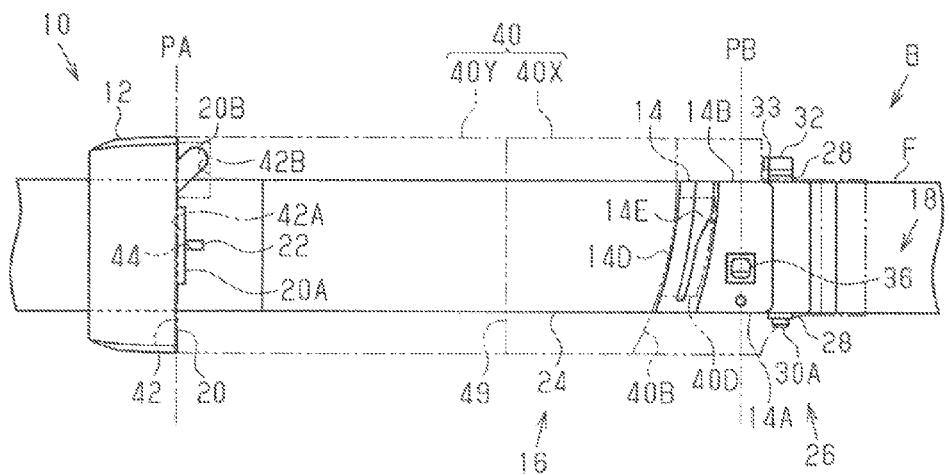
FIG. 3 is a top plan view of the battery holder illustrated in FIG. 1 in which the battery holder is in a state in which several batteries are removed.

As shown in FIG. 2, the first support portion 12 and the second support portion 14 are disposed apart from each other on the frame F. The first support portion 12 is detachable from the frame F. The first support portion 12 is attached to the frame P via a bolt S. As shown in FIG. 3, the first support portion 12 is provided with a terminal 22, which is electrically connectable to the battery unit 40, on an opposing surface 20, which is on the side with the second support portion 14 and opposes the battery unit 40. A fourth fitting portion 20A protrudes from the periphery of the opposing surface 20. The fourth fitting portion 20A is provided around the terminal 22. The fourth fitting portion 20A is formed on an end portion 42 of the battery unit 40. The fourth fitting portion 20A is configured to support the battery unit 40 at a first supporting position PA by fitting a first fitting portion 42A. The fitting portion 42A is a concave portion. The first supporting position PA corresponds to the position of the opposing surface 20 on the frame F. A guide portion 20B is provided in a position different from the fourth fitting portion 20A on the opposing surface 20 of the first support portion 12. The guide portion 20B is provided outward in the width direction of the fourth fitting portion 20A. The guide portion 20B protrudes from the opposing surface 20, toward the second support portion 14 and outward in the width direction of the bicycle B.

The second support portion 14 is detachable from the frame F. The second support portion 14 is attached to the frame F via a moving mechanism 16. The second support portion 14 comprises a shape that can be fitted into a recess 40B formed on a side surface 40A of the battery unit 40. As shown in FIG. 2, the second support portion 14 has a trapezoidal shape when the bicycle B is viewed from the side.

An opposing surface 14D of the second support portion 14 faces the first support portion 12. The opposing surface 14D is curved so as to approach the first support portion 12 when going from one side of the bicycle B to the other side in the width direction, A groove 14E extends in the width direction of the bicycle B. The groove 14E is formed on the opposing surface 14D. The groove 14E guides a contact portion 40D provided in the recess 40B of the battery unit 40 when attaching the battery unit 40. The groove 14E prevents the battery unit 40 from detaching toward the upper side in FIG. 2 when the battery unit 40 is mounted. The second support portion 14 can support the battery unit 40 at a second supporting position PR by fitting the recess 40B into the second support portion 14. The second supporting position PB corresponds to the position of the second support portion 14 on the frame F.

Figure 5:
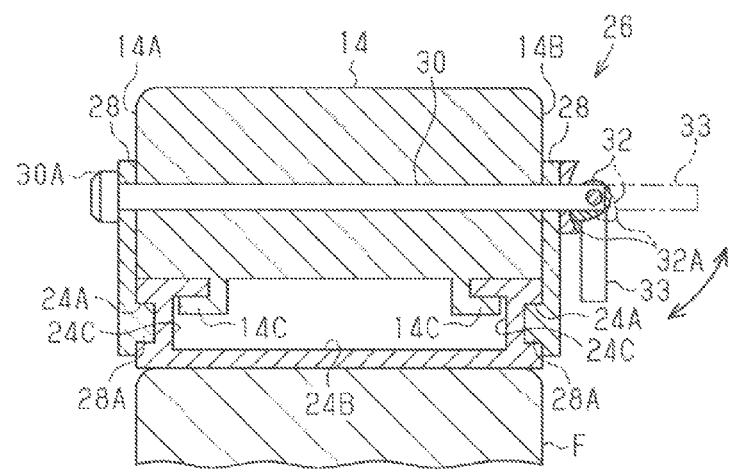
FIG. 5 is a cross-sectional view of the 5-5 line of the battery holder illustrated in FIG. 4 in which the battery holder is in a state in which several batteries are removed.

The moving mechanism 16 comprises a securing structure 26 and a pair of rails 24 for sliding the second support portion 14. The rails 24 can be attached to the frame F via the bolts S. The rails 24 can be detached from the frame F. The rails 24 extend along the frame F. As shown in FIG. 5, a groove 24B is formed in the middle portion in the width direction of the rail 24. The groove 24B extends in the longitudinal direction of the rails 24. A guide portion 14C is formed on the lower surface of the second support portion 14. The guide portion 14C is fitted in this groove 24B. The groove 24B comprises a wide portion 24C with a wide groove width on a portion of the frame F side. The guide portion 14C has a portion that extends to both sides in the width direction no as to fit into the wide portion 24C. With this arrangement, the second support portion 14 is prevented from falling out upward in FIG. 5, The second support portion 14 is movably attached to the rail 24 and, thus, can move with respect to the frame F of the bicycle B.

The length and mounting position of the rails 24 are set to be suitable for the battery to be mounted. Specifically, the end portion of the rail 24 in the longitudinal direction on the opposite side of the first support portion 12 is attached to the frame F so as to be in a position that is farther away from the first support portion 12 than the second supporting position PB, which is suitable for a battery that can be mounted. Additionally, the end portion of the rail 24 on the first support portion 12 side is attached to the frame F so as to be in a position that is farther on the side with the first support portion 12 than the second supporting position PB, which is suitable for a battery that can be mounted.

Figure 9:
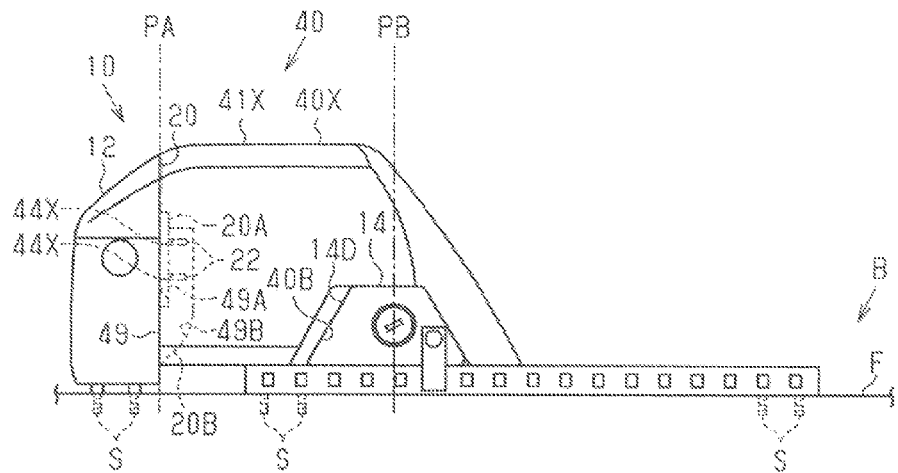
FIG. 9 is a side elevational view of the battery holder illustrated in FIG. 2 in which the battery holder is equipped with a small battery.
Figure 10:
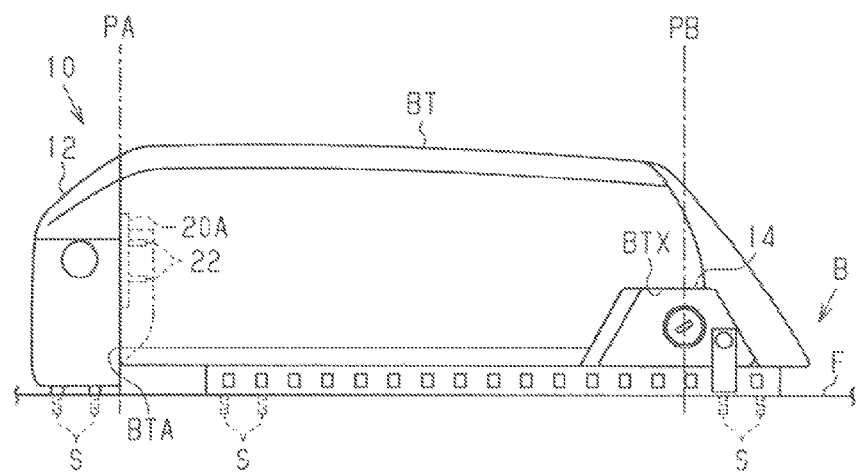
FIG. 10 is a side elevational view of the battery holder illustrated in FIG. 2 in which the battery holder is equipped with a battery that is larger than that of the small battery illustrated in FIG. 9.

The second supporting position PB suitable for the battery, for example, is determined on the basis of a state in which only a first battery 40X is mounted, as shown in FIG. 9, a state in which a battery BT that is larger than the first battery 40X is mounted, as shown in FIG. 10, or a state in which two batteries 40X and 40Y are mounted, as shown in FIG. 2.

As shown in FIG. 5, the securing structure 26 comprises two brackets 28, a shaft 30, an eccentric cam 32 and an operating unit 33.

The two brackets 28 are each attached to both sides 14A and 14B of the second support portion 14. A protrusion 28A is formed on each of the lower ends of the two brackets 28. Each of the protrusions 28A can be fitted into a recess 24A that is formed on the sides of the rails 24. As shown in FIG. 2, several recesses 24A are provided along the rails 24 at predetermined intervals. The second supporting position PB can be modified between the recess 24A formed at one end portion in the longitudinal direction of the rails 24 and the recess 24A formed at the other end portion. Accordingly, the second supporting position PB can be discontinuously modified in accordance with the positions of the recesses 24A.

The second supporting position PB can also be made to be continuously modifiable. For example, the brackets 28 can be configured without forming protrusions, the rails 24 can be configured without forming recesses 24A, and the second support portion 14 can be configured to be fixed to the rails 24 by the frictional force of the brackets 28 clamping the rails 24. With this configuration, the position of the second support portion 14 and the second supporting position PB with respect to the rails 24 can be modified continuously.

As shown in FIG. 5, the shaft 30 extends through the second support portion 14 and the two brackets 28 in the width direction. A stopper 30A that is larger than the diameter of shaft 30 is attached to one end of the shaft 30. One of the brackets 28 is sandwiched between the stopper 30A and the first side 14A, which is one side of the second support portion 14 in the width direction.

The eccentric cam 32 is attached to the other end of the shaft 30. The other bracket 28 is sandwiched between the eccentric cam 32 and the second side 14B, which is the other side of the second support portion 14 in the width direction. The eccentric cam 32 is mounted to the shaft 30 to be rotatable around the direction that is perpendicular to the axial direction of the shaft 30. The operating unit 33 is connected to the eccentric cam 32 and is used to move the rotational position of the eccentric cam 32 between the fixed position and the release position.

When the rotational position of the eccentric cam 32 is in the fixed position, as shown by the solid line in FIG. 5, a cam surface 32A of the eccentric cam 32 presses the other bracket 28 to the second side 14B of the second support portion 14 and the side of the rail 24. Additionally, the stopper 30A presses one of the brackets 28 to the first side 14A of the second support portion 14 and the sides of the rails 24. With this, the position of the second support portion 14 is fixed with respect to the rails 24 and the frame F. When the rotational position of the eccentric cam 32 is at the release position, as shown by the double-dotted, chained line in FIG. 5, the cam surface 32A of the eccentric cam 32 separates from the other bracket 28. With this, the protrusions 28A of the two brackets 28 can be detached from the recesses 24A of the rails 24. Accordingly, the second support portion 14 becomes movable with respect to the rails 24.

Figure 4:
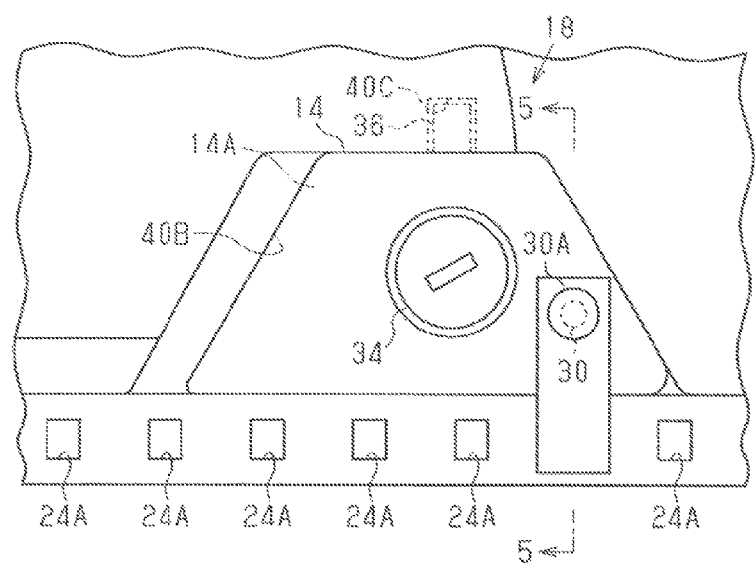
FIG. 4 is an enlarged side elevational view of a portion of the battery holder illustrated in FIG. 2.

As shown in FIG. 4, the lock mechanism 18 comprises a cylinder lock 34, and a latch 36. The cylinder lock 34 is fixed to the second support portion 14. The latch 36 is retractable by the cylinder lock 34. The cylinder lock 34 can be turned with a key that is not shown. The latch 36 switches between states of protruding above the second support portion 14 and being housed in the second support portion 14, along with the turning of the cylinder lock 34, When protruding from the second support portion 14, the latch 36 fits into a hole 40C that is formed inside of the recess 40B of the battery unit 40. With this, the battery unit 40 is prevented from undesirably detaching from the second support portion 14. When not being retracted by the cylinder lock 34, the latch 36 is in a state of protruding above the second support portion 14 via an elastic member (diagram omitted). With this, when the latch 36 does not face the hole 40C, such as when adjusting the position in order to attach the battery unit 40 to the battery holder 10, the latch 36 is pushed downward by the bottom of the battery unit 40. And, when the battery unit 40 is mounted to the supporting position wherein the latch 36 faces the hole 40C, the latch 36 fits in the hole 40C.

A configuration of a battery unit 40 will be explained with reference to FIGS. 2 and 6 to 8. The battery unit 40 of the present embodiment is configured by connecting a plurality of batteries.

Figure 6:
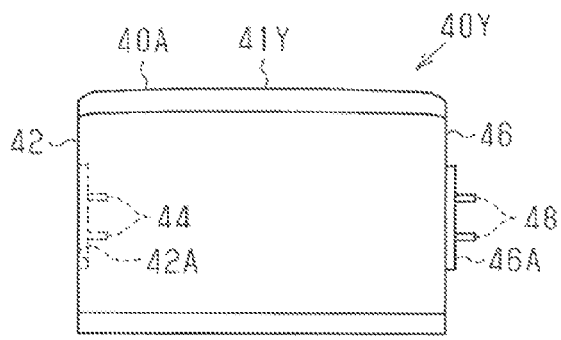
FIG. 6 is a side view of the battery of one embodiment that is mountable to the battery holder illustrated in FIG. 1.

As shown in FIG. 2, the battery unit 40 comprises a firs battery 40X and a second battery 40Y, which is a bicycle battery. The first battery 40X and the second battery 40Y both have a housing 41X and 41Y and are rechargeable batteries (diagram omitted) comprising a plurality of cells in the housings 41X and 41Y. The first battery 40X and the second battery 40Y are configured to be mechanically connectable. The above-described recess 40B is formed on the first battery 40X. When the battery unit 40 is mounted to the battery holder 10, the second battery 40Y is disposed between the first battery 40X and the first support portion 12. As shown in FIG. 6, the second battery 40Y has a substantially parallelepiped shape.

Figure 7:
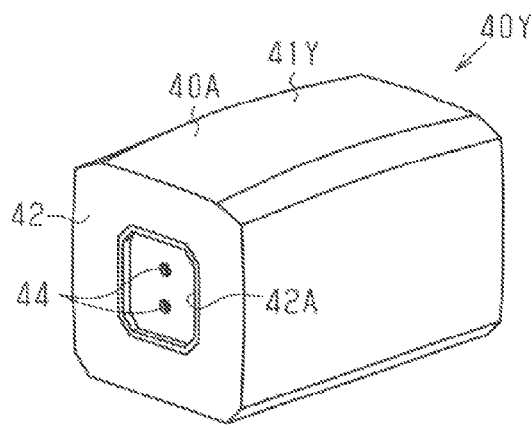
FIG. 7 is a perspective view of the battery illustrated in FIG. 6 seen from one end.

As shown in FIG. 7, a first terminal 44 is provided on the first end portion 42 in one direction of the second battery 40Y. The first terminal 44 is electrically connectable to the terminal 22 of the first support portion 12 of the battery holder 10 shown in FIG. 2. In a state in which the battery unit 40 is mounted to the battery holder 10, the first terminal 44 touches the terminal 22 of the first support portion 12. The first end portion 42 is the first portion. The first end portion 42 comprises a fitting portion 42A with a concave shape around the first terminal 44.

Figure 8:
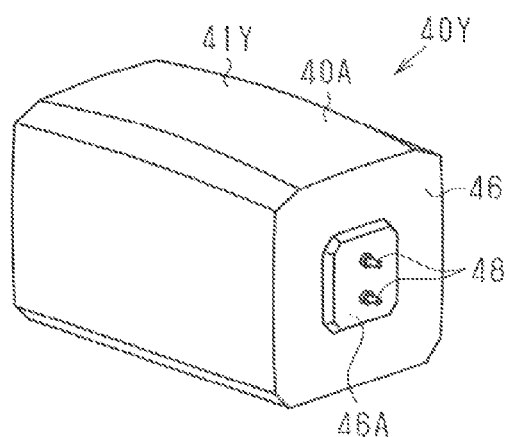
FIG. 8 is a perspective view of the battery illustrated in FIG. 6 seen from the other end.

As shown in FIG. 8, a second terminal 48 is provided at a second end portion 46 in one direction of the second battery 40Y. As shown in FIG. 2, the second terminal 48 is electrically connectable to a first terminal 44X of the first battery 40X, which is the first terminal of another battery. The second end portion 46 is the second portion. The second end portion 46 comprises a second fitting portion 46A with a convex shape around the second terminal 48, The first fitting portion 42A and the second fitting portion 46A are formed to have complementary shapes.

The first terminal 44X of the first battery 40X is formed in the same shape as the first terminal 44 of the second battery 40Y. The first battery 40X comprises a third fitting portion 49A formed around the first terminal 44 with a concave shape, along with a recess 49B (see FIG. 9) that is similar to the recess 40B, at the first end portion 49 in one direction. The end portion 49 of the first battery 40X has the same shape as the end portion 42 of the second battery 40Y.

When the first battery 40X is connected to the second fitting portion 46A, the first terminal 44X of the first battery 40X is connected to the second terminal 48. At this time, the electric power from the second battery 40Y can supply power to the drive unit D (see FIG. 1) of the bicycle B independent of the first battery 40X. Also, the electric power from the first battery 40X can supply power to the drive unit D (see FIG. 1) of the bicycle B independent of the second battery 40Y.

By fitting the first fitting portion 42A into the fourth fitting portion 20A, the second battery 40Y is stably supported to the first support portion 12. The third fitting portion 49A has the same shape as the first fitting portion 42A. Therefore, when the second battery 40Y is detached, as shown in FIG. 9, the first terminal 44X and the terminal 22 are electrically connectable by fitting the third fitting portion 49A of the first battery 40X into the first fitting portion 42A of the battery holder 10.

A first example of how to mount the first battery 40X and the second battery 40Y to the battery holder 10 will be described with reference to FIGS. 2 to 5.

First, the operator operates the operating unit 33 and turns the eccentric ca to the release position. Then, the operator pulls out the protrusions 28A of the two brackets 28 from the recesses 24A of the rails 24. Then, the operator moves the second support portion 14 to match the distance between the end portion 42 and the recess 40B where the battery unit 40, which is the first battery 40X and the second battery 40Y combined, is mounted to the first support portion 12.

Then, the operator fits the first fitting portion 42A of the second battery 40Y into the fourth fitting portion 20A of the first support portion 12. With this, the first terminal 44 makes contact with the terminal 22. Then, the operator fits the recess 40B of the first battery 40X into the second support portion 14 and locks this using the lock mechanism 18. Then, the operator moves the first battery 40X, along with the second support portion 14, in the direction that approaches the first support portion 12. At this time, the operator makes the first terminal 44 make contact with the second terminal 48 of the battery unit 40 while fitting the first fitting portion 42A of the second battery 40Y into the third fitting portion 49A of the first battery 40X.

Then, the operator fits the protrusions 28A of the two brackets 28 into the recesses 24A, which are formed in the corresponding positions of the rails 24. Then, the operator operates the operating unit 33 and turns the eccentric cam 32 to the fixed position. Through these operations, the two batteries battery units 40 become supported by the battery holder 10.

If the lengths of the first battery 40X and the second battery 40Y that will be coupled are predetermined, the rails 24 may be formed so that the second support portion 14 comes to the position that fits into the recesses 24A when the second support portion 14 is moved to the position that is most separated from the first support portion 12. Additionally, when mounting the same combination of batteries 40X and 40Y, from the second time on, the operation of moving the second support portion 14 can be omitted. Furthermore, marks corresponding to predetermined combinations of batteries 40X and 40Y may be provided on the rails 24, and the second support portion 14 may be moved to the position of the mark corresponding to the batteries 40X and 40Y that will be combined.

A second example of how to mount the first battery 40X and the second battery 40Y to the battery holder 10 will be described with reference to FIGS. 2 and 3. In the second example of the mounting methods, the second support portion 14 is fixed to the rails 24 so that the second supporting position PB corresponds beforehand to the length of the battery unit 40 that will be mounted.

First, the operator prepares the battery unit 40, which is in a state in which the third fitting portion 49A of the first battery 40X and the second fitting portion 46A of the second battery 40Y are fitted together. Then, the operator adjusts the positions of the recess 42B of the battery unit 40 and the guide portion 20B of the first support portion 12. At this time, the operator supports the battery unit 40 so that the opening of the recess 42B fits into the tip of the guide portion 20B, and the second battery 40Y is positioned farther outside of the frame F than the second support portion 14. Then, the operator swivels the battery unit 40 around the guide portion 20B, so that a contact portion 40D of the second battery 40Y moves along a groove 14E of the second support portion 14. Meanwhile, mounting a battery BT or only the first battery 40X to the battery holder 10 is also possible by using a second example of this mounting method.

The action of the battery holder 10 will be explained with reference to FIGS. 2, 9 and 10. The second supporting position PB of the second support portion 14 of the battery holder 10 can be modified. Specifically, as shown in FIG. 2, when mounting a first battery 40X and a second battery 40Y on a bicycle B, the second supporting position PB is set to the position of a recess 40B of the first battery 40X on the side away from a first supporting position PA. As shown in FIG. 9, when mounting only the first battery 40X on the bicycle B, the second supporting position PB is set to the position of the recess 40B of the first battery 40X. Additionally, as shown in FIG. 10, when mounting a battery BT, which is larger than the first battery 40X, to the bicycle B, the second supporting position PB is set to the position of a recess BTX of the battery BT. Meanwhile, one end portion BTA of the battery BT comprises the same shape as the end portion 42 of the second battery 40Y. With this, the end portion BTA of the battery BT is supported by the first support portion 12. In this way, the battery holder 10 can support the number of batteries 40 that the rider desires or a battery BT that has a different size than the battery unit 40.

With the battery holder 10 the following effects can be obtained.

(1) The second supporting position PB of the battery holder 10 can be modified. For this reason, the number of batteries 40X and 40Y to be mounted on the bicycle B can be changed. Additionally, mounting the battery unit 40, the first battery 40X, and the battery BT, with different capacitances and weights, to the bicycle B is possible. For this reason, the usability can be improved.

(2) The second support portion 14 is movable with respect to the bicycle B. For this reason, the second supporting position PB can be modified more easily, as compared to a configuration that modifies the second supporting position PB by attaching and detaching the second support portion 14 to and from the frame F.

(3) The battery holder 10 comprises a moving mechanism 16, including at least one of the rails 24. For this reason, the second supporting position PB can be modified easily by sliding the second support portion 14 on the rails 24.

(4) The moving mechanism 16 comprises a securing structure 26 that can secure the position of the second support portion 14 via the rotation of the eccentric cam 32. For this reason, the second support portion 14 can be easily moved, and the position of the second support portion 14 can be easily fixed.

(5) The second support portion 14 has a convex shape that fits into the recess 40B of the battery unit 40. For this reason, the second support portion 14 can stably support the battery unit 40.

(6) The second support portion 14 comprises a lock mechanism 18. For this reason, the battery unit 40 can be prevented from being detached from the second support portion 14.

The following effects are obtained with the battery unit 40.

(1) The battery unit 40 comprises a fitting portion 42A configured to be supportable via the battery holder 10, as well as a second fitting portion 46A that is connectable to another battery 40 in a portion besides the first fitting portion 42A. For this reason, since batteries 40 can be coupled and mounted to the battery holder 10, the user can mount a desired number of batteries 40 to the bicycle 13, improving usability.

(2) The first terminal 44 of the battery unit 40 is connectable to the terminal 22 of the battery holder 10 and the second terminal 48 of another battery 40. For this reason, since the battery can be electrically connected to another battery 40 using the first terminal 44, the drive unit D can use a plurality of batteries 40 consecutively in order or connected at the same time.

The specific forms that the bicycle battery holder and the bicycle battery can take are not limited to the forms illustrated in the above-described embodiment. The bicycle battery holder and the bicycle battery can take various forms that are different from the above-described embodiment. The modified example of the above-described embodiment presented below is one example of the various forms that the bicycle battery holder and the bicycle battery can take.

Figure 11:
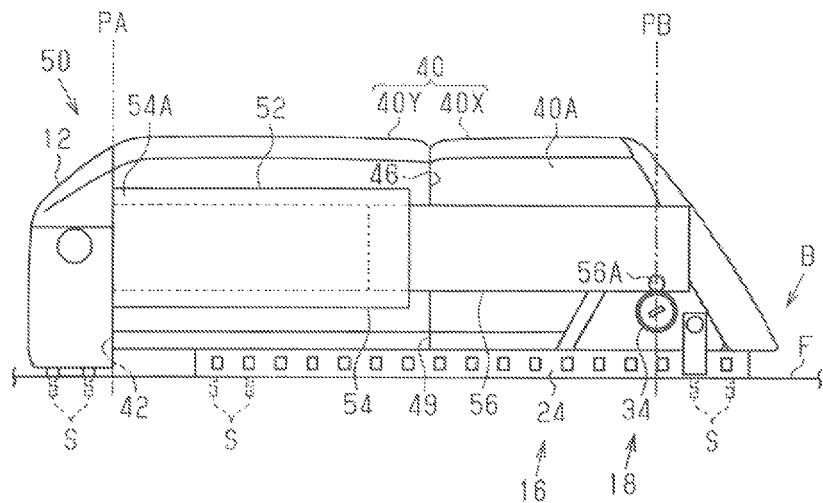
FIG. 11 is a side elevational view of a battery holder in accordance with a first modified example.
Figure 12:
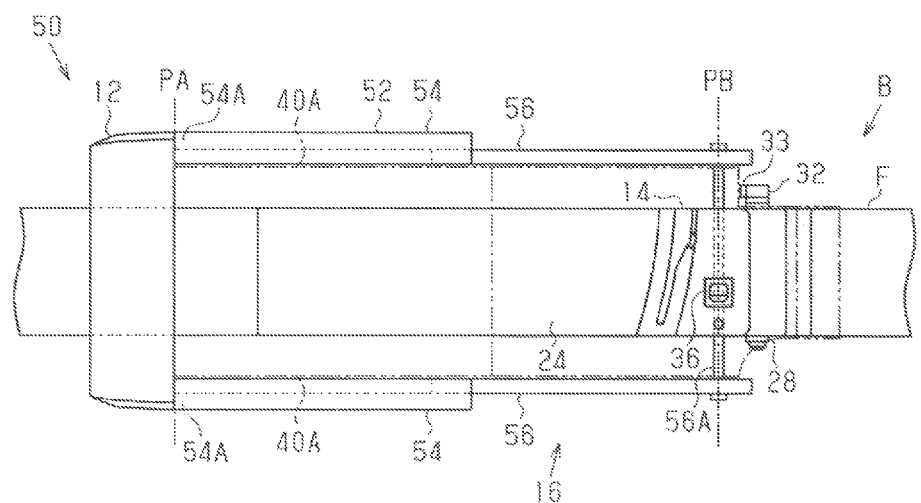
FIG. 12 is a top plan view of the battery holder illustrated in FIG. 11.

It is also possible to change the battery holder 10 to a battery holder 50, as shown in FIGS. 11 and 12. The battery holder 50 comprises a retaining part 52. The retaining part 52 comprises a first portion 54 and a second portion 56. The retaining part 52 holds a side surface 40A, which is a portion of the battery unit 40 that is different from both the first support portion 12 and the second support portion 14. The second portion 56 is provided to be fixed to the first support portion 12. The first portion 54 is coupled to the second portion 56, slidably with respect to the second portion 56. The first portion 54 and the second portion 56 are provided on either sides of the first support portion 12 and the second support portion 14 in the width direction. One end portion 54A of the first portion 54 is attached to the side of the first support portion 12. The other end portion 56A of the second portion 56 is attached to the side of the second support portion 14. For this reason, the retaining part 52 couples the first support portion 12 and the second support portion 14. The retaining part 52 changes in length, along with the changing of the distance between the first support portion 12 and the second support portion 14, when the second support portion 14 moves on the rail 24.

Figure 13:
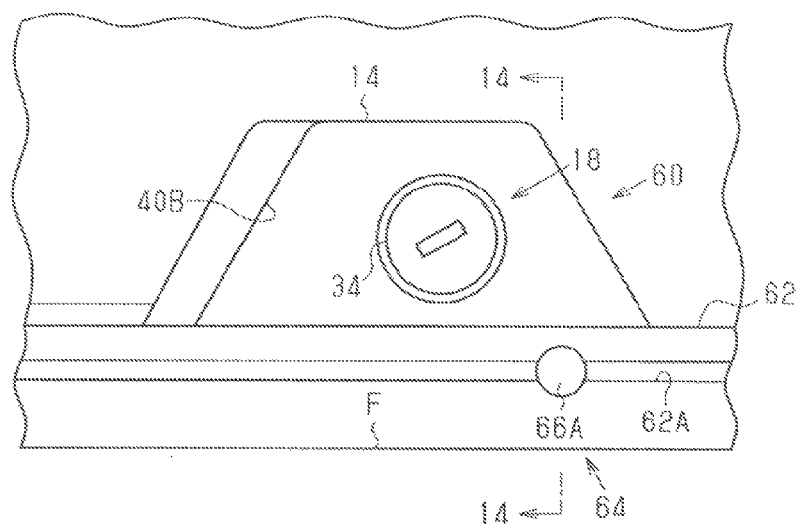
FIG. 13 is a side elevational view of an enlarged portion of a battery holder in accordance with a second modified example.
Figure 14:
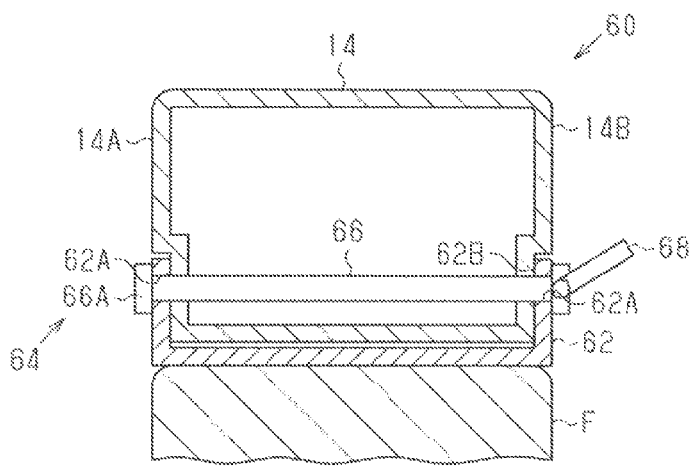
FIG. 14 is a cross-sectional view of the battery holder illustrated in FIG. 13 as seen along section line 14-14 in which the batteries are removed.

It is also possible to change the moving mechanism 16 of the battery holder 10 to a moving mechanism 60, as shown in FIGS. 13 and 14. The moving mechanism 60 comprises a rail 62 and a securing structure 64. A groove 62A is formed on the side of the rail 62 extending along the longitudinal direction of the rail 62. The cross section of the rail 62 has a U-shape. The lower part of the second support portion 14 is fitted into a U-shaped opening 62B. The U-shaped opening 62B is slightly larger than the second support portion 14. The securing structure 64 comprises a lever 68 and a shaft 66 that extends through the second support portion 14 and fits into the groove 62A. The lever 68 is attached to one end of the shaft 66. A stopper 66A with a larger diameter than the shaft 66 is attached on the other end of the shaft 66.

In the modified example described above, when the rotational position of the lever 68 is in the fixed position, the stopper 66A presses to sides 14A and 14B of the second support portion 14 via the rail 62. With this, the position of the second support portion 14 with respect to the rail 62 and the frame F is fixed. When the rotational position of the lever 68 is in the release position, a gap is formed between the rail 62 and the sides 14A and 14B of the second support portion 14. With this, the second support portion 14 becomes movable along the groove 62A of the rail 62.

Figure 15:
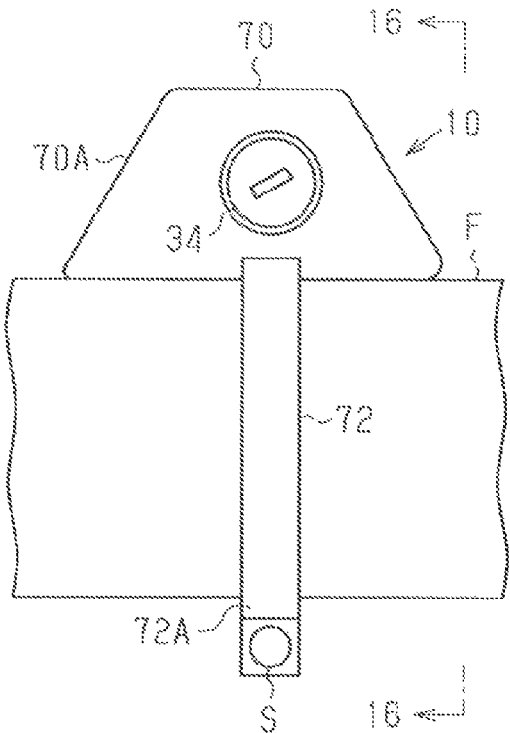
FIG. 15 is a side elevational view of an enlarged portion of the battery holder in accordance with a third modified example.
Figure 16:
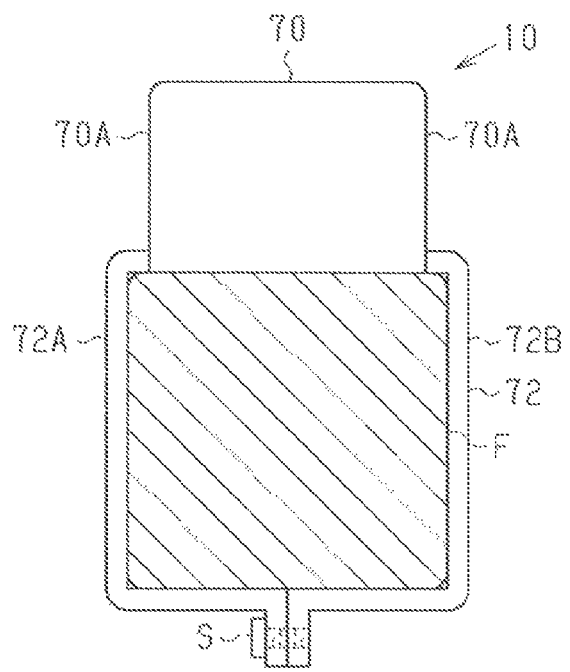
FIG. 16 is a cross-sectional view of the battery holder illustrated in FIG. 15 as seen along section line 16-16.

It is also possible to change the second support portion 14 of the battery holder 10 to a second supporting portion 70, as shown in FIGS. 14, 15 and 16. The second support portion 70 comprises a holder 72 that can be attached to the frame F. The holder 72 comprises a first holder 72A, which extends from one side 70A of the second support portion 70, and a second holder 72B, which extends from the other side 70A of the second support portion 70. The holder 72 can cover the outer circumference of the frame F. The position of the second support portion 70 with respect to the frame F is fixed by the end portion of the first holder 72A and the end portion of the second holder 72B being fixed with, for instance, a bolt S. When modifying the second supporting position PB, the holder 72 is detached from the frame F, and the second support portion 70 is attached to the desired position on the frame F.

It is also possible to change the first support portion 12 of the battery holder 10 to be movable with respect to the frame F. In this case, for example, the first support portion 12 can be disposed on the rail 24, and a moving mechanism 16 similar to the second support portion 14 can be provided. Also, in this case, the second support portion 14 can be fixed to the frame F with, for example, a bolt.

It is also possible to omit the guide portion 20B. In this case as well, the first battery 40X or the first battery BT can be attached to the battery holder 10 with the first example of the mounting method for the battery holder 10 described in the embodiment.

Figure 17:
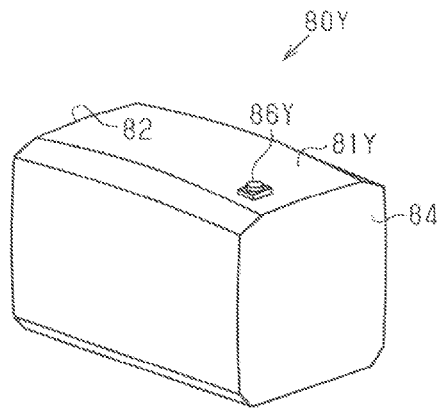
FIG. 17 is a perspective view of the battery of the modified example seen from the other end.
Figure 18:
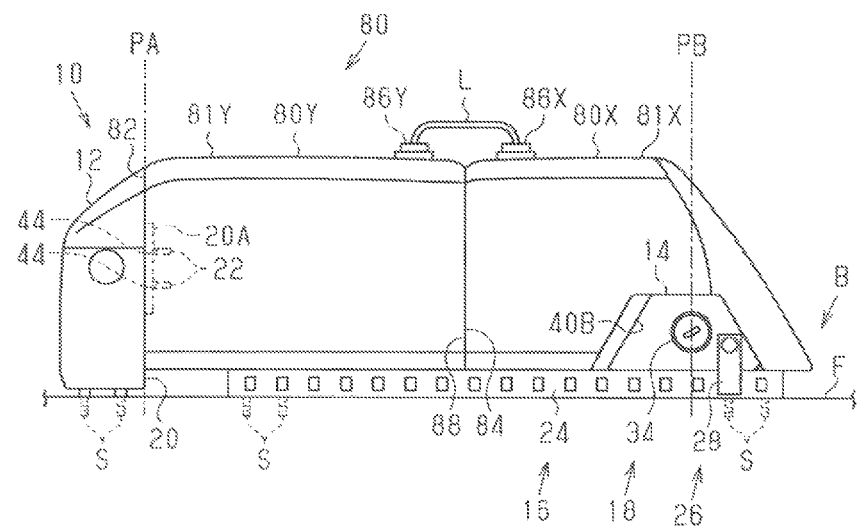
FIG. 18 is a side elevational view of the battery holder in FIG. 2 in which the battery holder is equipped with the batteries of FIG. 17 that are coupled together.

It is also possible to change the battery unit 40 to a battery unit 80, as shown in FIGS. 17 and 18. The battery unit 80 comprises a second battery 80Y, as shown in FIGS. 17 and 18, and a first battery 80X, as shown in FIG. 18. The second battery 80Y comprises a first terminal 44 for connecting to the terminal 22 of the battery holder 10, in one end portion 82. The other end portion 84 of the battery unit 80 comprises a flat shape. A connector 86Y is formed on a side 81Y of the second battery 80Y. Additionally, the first battery 80X does not comprise a terminal at the end portion 88 but, instead, is provided with a connector 86X on a side 81X. A plurality of batteries 80X and 80Y can be electrically connected by connecting an electric wire L to the connectors 86Y of the first battery 80X and the second battery 80Y.

It is also possible to configure the battery unit 40 to comprise three or more batteries 40X and 40Y. For example, when configuring the battery unit 40 with one first battery 40X and two second batteries 40Y, one of the second batteries 40Y is connected to the first support portion 12, and the first battery 40X is connected to the second support portion 14. Then, the other of the second batteries 40Y is disposed between one of the second batteries 40Y, which is supported by the first support portion 12 and the first battery 40X, which is supported by the second support portion 14. In this case, the other of the second batteries 40Y amounts to another battery with respect to the one of the second batteries 40Y.

Figure 19:
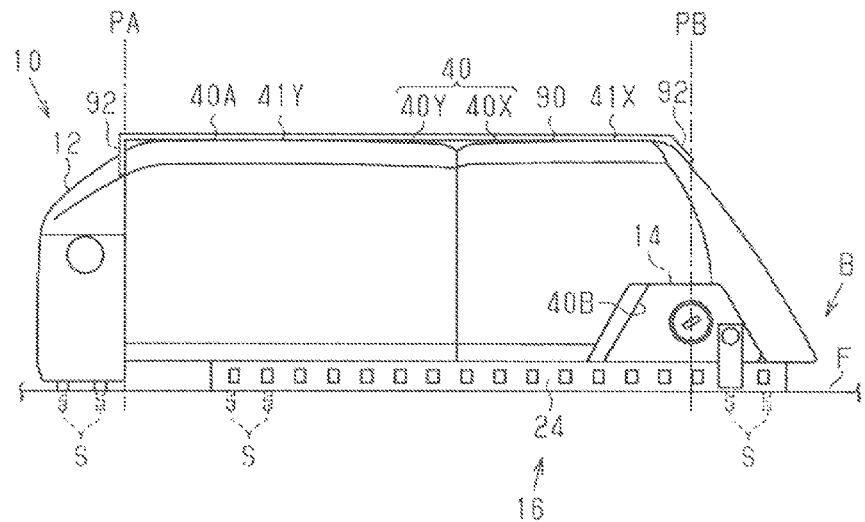
FIG. 19 is a side elevational view of a retaining member for a battery of one embodiment.

It is also possible to support the battery unit 40 using a retaining member. A retaining member 90 shown in FIG. 19 comprises two attaching portions 92 that can be attached to each of the two battery units 40. The two attaching portions 92 are formed on either ends of a plate-shaped retaining member 90. The attaching portion 92 is a flange formed on the retaining member 90. The retaining member 90 covers part of the side 40A of the two battery units 40. One of the two attaching portions supports the end portion 42 of the battery unit 40, which is supported by the first support portion 12. The other of the two attaching portions supports the end portion 46 of the battery unit 40, which is supported by the second support portion 14. According to the retaining member 90, deviating from a state in which the two battery units 40 are coupled is hard. For this reason, the retaining member 90 can stably support the two battery units 40. Additionally, forming a recess or a protrusion on the side of the battery 40 is possible, and configuring the attaching portion 92 into a protrusion or a recess that fits into this hole is possible. In this case, the retaining member 90 can support the three or more batteries 40X and 40Y by comprising three or more protrusions or recesses.

It is also possible to form a recess that fits the second support portion 14 into the second fitting portion 46A of the battery unit 40. In this case, the battery unit 40 is supported by the second support portion 14 via the second fitting portion 46A. Also, in this case, the recess 40B of the battery unit 40 can be omitted.

It is also possible to form a protrusion on a side 40A of the battery unit 40. In this case, the second support portion 14 has a concave shape that fits into this protrusion.

It is also possible to change the battery unit 40 to a battery unit 40 in which the first fitting portion 42A has a convex shape and a second fitting portion 46A has a concave shape. In this case, the opposing surface 20 of the first support portion 12 has a concave shape into which the protrusion of the first fitting portion 42A is fitted.

It is also possible to configure a presentation unit on the side 40A of each of the batteries 40X and 40Y to show the remaining amount of the battery unit 40. The presentation unit, for example, is an LED.

Figure 20:
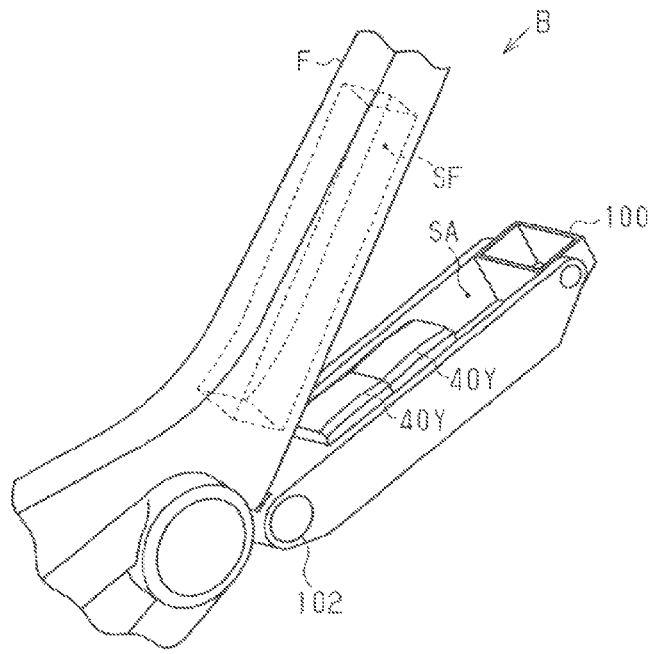
FIG. 20 is a perspective view of a battery holder in accordance with a modified example equipped with the battery illustrated in FIG. 6.

It is also possible to mount a plurality of second batteries 40Y to a bicycle B, which comprises a battery holder 100 shown in FIG. 20. The lower portion of the frame F of the bicycle B is opened. The battery holder 100 is attached to the lower portion of the frame F via a rotating shaft 102. The upper portion of the battery holder 100 is opened. A space SA where a plurality of batteries can be disposed is formed inside of the battery holder 100. The space SA can, for example, house three second batteries 40Y. For this reason, when housing one or two second batteries 40Y in the battery holder 100, disposing a box for housing tools, etc. in the space SA is possible. Each second battery 40Y is positioned and prevented from moving within the holder 100 by housing the box. At least a part of the battery holder 100 is housed in a space SF formed in the frame F by rotating around the rotating shaft 102.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle battery holder configured to be mounted to a bicycle, the bicycle battery holder comprising:
    a first support portion configured to support a battery at a first supporting position, the first support portion configured to be detachably connected to a bicycle frame;
    a second support portion configured to support the battery at a second supporting position, along with the first support portion; and
    a moving mechanism having a rail, the second portion being slidably connected to the rail such that the rail is configured to enable the second portion to move with respect to the first portion.

2. The bicycle battery holder as recited in claim 1, further comprising
    a securing structure selectively securing a position of the second support portion with respect to the rail.

3. The bicycle battery holder as recited in claim 1, wherein
    the rail is configured to be detachably mounted to the bicycle frame.

4. The bicycle battery holder as recited in claim 1, wherein
    the first support portion is configured to support one end of the battery, and
    the second support portion is configured to support the other end of the battery.

5. The bicycle battery holder as recited in claim 1, wherein
    the second support portion has one of a convex shape and a concave shape that is configured to mate with one of a protrusion and a recess of the battery having one of a convex shape and a concave shape.

6. The bicycle battery holder as recited in claim 1, wherein
    the first support portion comprises a terminal that is configured to be electrically connected to the battery.

7. The bicycle battery holder as recited in claim 1, wherein
    the second support portion comprises a lock mechanism that is configured to fix a position of the battery with respect to the second support portion.

8. A bicycle battery holder comprising:
    a first support portion configured to support a battery at a first supporting position;
    a second support portion configured to support the battery at a second supporting position, along with the first support portion, at least one of the first supporting position and the second supporting position being adjustably mounted; and
    a retaining part configured to support the battery in a portion that is different from the first support portion or the second support portion,
    the retaining part being configured to couple the first support portion and the second support portion and change in length, corresponding to changes in a distance between the first support portion and the second support portion.

9. A bicycle battery comprising:
    a housing having a plurality of battery cells configured to provide electric power to an electric component of a bicycle, the housing having a first portion configured to be supportable by a bicycle battery holder and a second portion configured to be connected to another battery in a portion beside the first portion, the battery cells being configured to provide electric power to the electric component independently from another battery in a state where the another battery is connected to the second portion.

10. The bicycle battery as recited in claim 9, further comprising
    a first terminal provided at the first portion, which is configured to be connected to a terminal provided to one of the bicycle battery holder and a terminal of another battery.

11. The bicycle battery as recited in claim 10, wherein
    the second portion includes a second terminal configured to be connected to a first terminal of another battery.

12. The bicycle battery as recited in claim 11, wherein
    the first portion comprises a first fitting portion having one of a convex shape and a concave shape, and
    the second portion comprises a second fitting portion having one of a convex shape and a concave shape that can be fitted with one of a protrusion and a recess of the first portion.

13. The bicycle battery as recited in claim 12, wherein
    the first fitting portion is formed around the first terminal, and
    the second fitting portion is formed around the second terminal.

14. A bicycle battery retaining member used in the bicycle battery as recited in claim 9, and comprising
    a plurality of attaching portions that are attachable to another battery and the bicycle battery.

* * * * *